United States Patent
Zhang et al.

(10) Patent No.: US 7,127,428 B2
(45) Date of Patent: Oct. 24, 2006

(54) DYNAMIC BUSINESS RELATIONSHIP ESTABLISHMENT IN A PUBLIC WIRELESS LAN ENVIRONMENT

(75) Inventors: Junbiao Zhang, Bridgewater, NJ (US); Kumar Ramaswamy, Plainsboro, NJ (US); Charles Chaunming Wang, Jamison, PA (US); Sachin Satish Mody, Lawrenceville, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 556 days.

(21) Appl. No.: 10/206,683

(22) Filed: Jul. 26, 2002

(65) Prior Publication Data

US 2003/0212638 A1 Nov. 13, 2003

Related U.S. Application Data

(60) Provisional application No. 60/378,030, filed on May 13, 2002.

(51) Int. Cl.
*G06F 17/60* (2006.01)

(52) U.S. Cl. .................................. 705/53; 379/114
(58) Field of Classification Search ............ 705/26–27, 705/34, 39–40, 44, 50–51, 64–80; 713/155–158, 713/168–180, 200–202; 707/9–10, 100–104; 379/111, 114–127; 709/200–203
See application file for complete search history.

(56) References Cited

U.S. PATENT DOCUMENTS

| | | | |
|---|---|---|---|
| 4,706,275 A | 11/1987 | Kamil | 379/144 |
| 6,047,051 A * | 4/2000 | Ginzboorg et al. | 379/130 |
| 6,119,109 A * | 9/2000 | Muratani et al. | 705/400 |
| 6,292,789 B1 * | 9/2001 | Schutzer | 705/40 |
| 6,477,513 B1 * | 11/2002 | Walker et al. | 705/76 |

FOREIGN PATENT DOCUMENTS

| | | |
|---|---|---|
| EP | 1 178 644 A2 | 2/2002 |
| WO | WO 00/69113 | 11/2000 |
| WO | WO 01/54379 A1 | 7/2001 |
| WO | WO 01/76134 A1 | 10/2001 |
| WO | WO 02/05520 A2 | 1/2002 |
| WO | WO 2067616 A1 * | 8/2002 |

OTHER PUBLICATIONS

Gramaglia et al., "VPNs offer new billing challenges for ISPs", Telecommunications (Americas Edition) v33n1, pp 43, 46, Jan. 1999, ISSN: 0278-4831.*
Sophia Antipolia; *3GPP TS 23.101 V.4.0.0* (Apr. 2001), Valbonne-France.
Unitech; *Unitech Solutions Introducing Unitech Subscriber Solutions* (May 17, 2002) USA.
Bizwatch; *GRIC Offers Prepaid Wireless Service to Network and Corporate Customers Through MIND CTI* (Oct. 29, 2001) USA.

* cited by examiner

*Primary Examiner*—Mary D. Cheung
(74) *Attorney, Agent, or Firm*—Joseph S. Tripoli; Joseph J. Laks; Robert B. Levy

(57) ABSTRACT

An operator of a network (20) dynamically establishes a business relationship with a Billing Agent (26) to enable the network operator to receive reimbursement for access charges incurred by one or more users ($12_1$, $12_2$ and $12_3$). To establish such a relationship, the network operator first opens a communications channel to the Billing Agent after which the network operator and Billing Agent verify each other. Following verification, the network operator communicates proposed business terms and conditions, including access charges, to the Billing Agent. In response, the Billing Agent sends to the network operator an acceptance of business terms acceptable to the Billing Agent. After reaching agreement on the terms and conditions, the Billing Agent and network operator will each digitally acknowledge a formal agreement that embodies the agreed upon terms.

13 Claims, 1 Drawing Sheet

DYNAMIC BUSINESS RELATIONSHIP ESTABLISHMENT IN A PUBLIC WIRELESS LAN ENVIRONMENT

CROSS REFERENCE TO RELATED APPLICATION

This application claims priority under 35 U.S.C. 119(e) to U.S. Provisional Patent Application Ser. No. 60/378,030 filed May 13, 2002, the teachings of which are incorporated herein.

TECHNICAL FIELD

This invention relates to a technique for enabling an operator of a network, such as a wireless LAN, to dynamically establish a business relationship with a Billing Agent serving a user so that the network operator can receive reimbursement from the Billing Agent for access charges incurred by the user.

BACKGROUND ART

Presently, providers of data communications services have established wireless Local Area Networks (LANs) ("hot spots") at publicly accessible facilities, such as rest stops, cafes, and libraries, to allow users to access a private data network or a public data network, such as the Internet for a fee. Upon entering such a publicly accessible facility, the user establishes a communication link, typically over a wireless channel, with an access point to access to the LAN, and the public or private network therebeyond. When initiating a communications session with the wireless LAN, the user must provide a PIN that identifies an account number to provide payment for access fees. Often, the transmission of the PIN occurs without any encryption, especially if the user accesses the wireless LAN for the first time. Thus, in the absence of any prior relationship with the user, the wireless LAN lacks any key by which to decrypt a user-encrypted transmission. An unencrypted wireless transmission of sensitive information such as a PIN creates a serious security risk since hackers often can readily intercept wireless LAN traffic.

As described in our co-pending Provisional U.S. patent application No. 60/378,030, filed May 13, 2002, and in co-pending regular U.S. patent application Ser. No. 10/183,081, filed Jun. 27, 2002, a user can achieve secure authentication by first entering a request that identifies a Billing Agent that will provide payment to the operator of the LAN for the access charges incurred by the user. (The Billing Agent and LAN operator can be operated by the same entity or different entities.) The wireless LAN then queries the Billing Agent to obtain a copy of the agent's digital certificate for transmission to the user. The user verifies the certificate and then encrypts his/her PIN in accordance with the certificate. The wireless LAN forwards the user's encrypted PIN to the Billing Agent for authentication. Upon successful authentication of the user, the Billing Agent informs the wireless LAN, which then extends service. At the completion of access by the user, the wireless LAN accumulates the access charges for receipt by the Billing Agent, which reimburses the wireless LAN operator while debiting the user's account accordingly.

In order to for the user to successfully access the wireless LAN following authentication as described above, the wireless LAN operator must have a business relationship with the Billing Agent chosen by the user. Otherwise, the Billing Agent likely will not honor a request for reimbursement. As the number of wireless LANs continues to grow, a user seeking access over a widespread geographic area would need to maintain an account with a variety of different wireless LANs or their captive Billing agents, an impractical requirement.

Thus, there is a need for a technique whereby a wireless LAN operator can dynamically establish a business relationship with a Billing Agent to facilitate access to the wireless LAN by a user served by that Billing Agent.

BRIEF SUMMARY OF THE INVENTION

Briefly, in accordance with the present principles, there is provided a method for enabling a network operator to establish a business relationship with a Billing Agent. Such a relationship enables the network operator to receive reimbursement from the Billing Agent for charges incurred by a user accessing the network. To establish a business relationship, the network operator first opens a communications channel with the Billing Agent. Thereafter, the network operator verifies the Billing Agent, typically by exchanging digital certificates. Upon verification, the network operator communicates to the Billing Agent proposed business terms and conditions, including a charges for user access. In response, the network operator will receive from the Billing Agent an acceptance of business terms and conditions agreeable to the Billing Agent. For example, the Billing Agent may simply accept the terms and conditions proposed by the network operator. Alternatively, the Billing Agent could return a counter-proposal of acceptable terms and conditions. Upon acceptance by the Billing agent of the terms and conditions proposed by the network operator, or in the event of a counter proposal from the Billing Agent whose terms and conditions the network operator will accept, then the network operator and the Billing Agent enter into a formal agreement that each will acknowledge by appending its digital signature.

DETAILED DESCRIPTION

Figure 1:
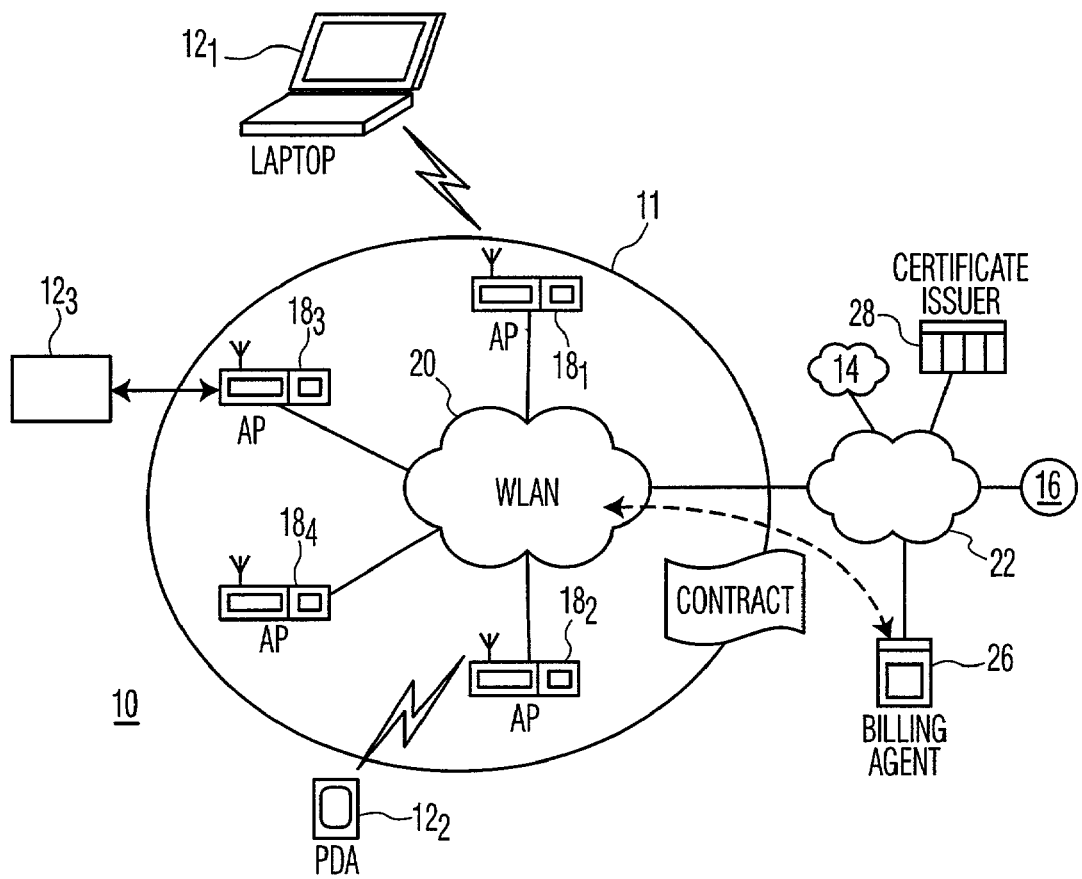
FIG. 1 illustrates a block schematic diagram of a wireless LAN for implementing the method of the present principles for establishing a business relationship with a Billing Agent.

FIG. 1 depicts a block schematic diagram of a network 10 that includes an access arrangement 11 enabling at least one user, and preferably a plurality of users (e.g., users $12_1$, $12_2$, and $12_3$) to securely access either a private data network 14 or a public data network 16, such as the Internet. In a preferred embodiment, the user $12_1$ utilizes a lap top computer to communicate with the access arrangement 11, while the user $12_2$ utilizes a Personal Data Assistant, and the user $12_3$ utilizes a wired device. Other users (not shown) could employ other types of wired or wireless communication appliances.

The access arrangement 11 of FIG. 1 includes at least one, and preferably, a plurality of access points (e.g., access points $18_1$–$18_4$) via which the users $12_1$, $12_2$ and $12_3$ access a wireless Local Area Network (LAN) 20. A gateway 22 provides a communication path between the wireless LAN 20 and the private and public networks 14 and 16, respectively. In the illustrated embodiment, each access point, such as access point $18_1$, includes a wireless transceiver (not shown) for exchanging radio frequency signals with a radio transceiver (not shown) within a communications appliance employed by a user. One or more of the access points $18_1$–$18_4$ could also include a wired access mechanism by which a user, such as user $12_3$, can access the network via a wired communications appliance. To this end, each of the access point $18_1$–$18_4$s employs a well-known wireless or wired data exchange protocol, such as the "HiperLan 2" or IEEE 802.11 protocol. Indeed, different access points can employ different wireless or wired protocols to accommodate users whose communications devices use different wireless or wired protocols, respectively.

As described in our co-pending U.S. Provisional Patent Application Ser. No. 60/378,030 and in co-pending regular U.S. patent application Ser. No. 10/183,081, filed Jun. 27, 2002, a user, such as user $12_1$, gains access to the wireless LAN 20 by first entering a request through the wireless LAN to a Billing Agent 26 to obtain the agent's digital certificate. Rather than forwarding the certificate directly to the requesting user, the Billing Agent 26 can request that the entity that issued the certificate, such as Certificate Issuer 28 of FIG. 1, forward the certificate to the requesting user. The user will verify the certificate after its receipt from the Billing Agent 26. Thereafter, the user then encrypts his/her PIN in accordance with the certificate. The wireless LAN 20 forwards the user's encrypted PIN to the Billing Agent 26 for authentication. Upon successful authentication of the user, the Billing Agent 26 informs the wireless LAN 20 which then extends access to the user. At the completion of user access, the wireless LAN 20 accumulates the access charges and forwards them to the Billing Agent 26, which debits the user's account and credits the wireless LAN operator's account accordingly. The Billing Agent 26, which can be operated by the same entity that operates the wireless LAN 20, or by a different entity, thus serves as a financial intermediary for reimbursing the operator of the Wireless LAN for access charges incurred by a user, such as user $12_1$, while debiting the user's account in the amount of such charges, and any associated service fee. (Note that while FIG. 1 depicts a single Billing Agent 26, multiple Billing Agents can exist to serve different users.)

The access method described above presumes that the operator of the wireless LAN 20 already has an existing business relationship with the Billing Agent 26 so that the wireless LAN operator can expect to receive reimbursement for access charges incurred by the user, as well as any agreed upon service charges and/or revenue sharing. In practice, the user establishes a relationship (i.e., a contractual agreement) with the Billing Agent 26 in advance of access of the wireless LAN 26. Under such an agreement, the user typically agrees not to pay more than a maximum prescribed rate for access, measured either on a time basis or on the basis of the volume of data sent and/or received, as well as a maximum service charge, if any. As part of the process of establishing an account with the Billing Agent 26, the user can arrange to deposit a certain sum of money in advance to obtain pre-paid access. The Billing Agent 26 will then debit the user's prepaid account in the amount of the access charges incurred as well as any agreed upon service charges. Alternatively, the user can arrange to have the Billing Agent 26 debit the user's credit card or a bank account for access and service charges. A hybrid arrangement can exist whereby the Billing Agent 26 will debit a pre-paid account until depletion, whereupon the pre-paid account is automatically recharged in a predetermined amount charged to the user's credit card or bank account. On the other hand, access charges incurred after depletion of the pre-paid account could be charged directly to the user's credit card or bank account.

As discussed above, the Billing Agent 26 can exist independently of the wireless LAN 20. Thus the Billing Agent 26 need not have a business relationship with the operator of the wireless LAN 20 in advance of access by a user served by the Billing Agent. A simple solution to the problem of a lack of a prior business relationship between the operator of the wireless LAN 20 and the Billing Agent 26 would have the Billing Agent simply accept access charges from the LAN operator following user access. This approach incurs the disadvantage that the Billing Agent 26 would have to accept all access charges, including access charges that exceed the maximum rate previously agreed upon between the Billing agent and the user. In absence of a pre-arranged relationship, the Billing agent 26 will often refuse to accept access charges. To avoid non-payment, the operator of the wireless LAN 20 will typically to refuse access to any user served by a Billing Agent 26 that lacks an existing business relationship with the wireless LAN operator.

Figure 2:
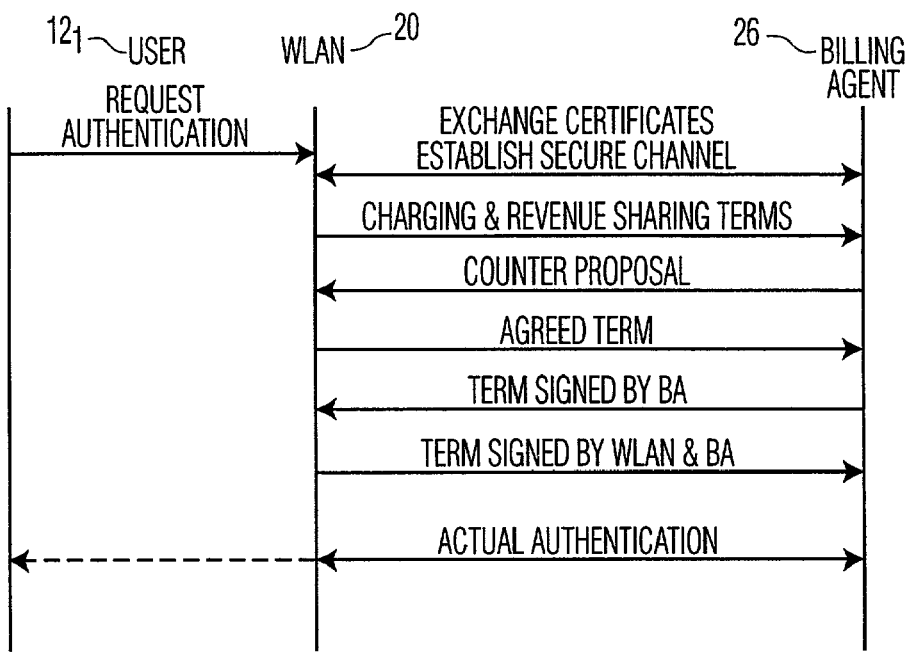
FIG. 2 illustrates a ladder logic diagram depicting the communications occurring between the LAN operator and Billing Agent to establish a business relationship in accordance with the method of the present principles.

In accordance with the present principles, there is provided a method whereby the operator of the wireless LAN 20 can dynamically establish a business relationship with the Billing Agent 26, especially when a user served by that Billing Agent seeks initial access to the wireless LAN. The present method is best understood by reference to FIG. 2, which illustrates the sequence of communications among: (1) the user, (2) the wireless LAN 20, and (3) the Billing Agent 26. As depicted in FIG. 2, a user, (e.g., user $12_1$) seeking access to the wireless LAN 20 initially makes a request for authentication. Such a request will identify the Billing Agent 26 that serves the user. Upon receipt of the authentication request, the wireless LAN 20 will first establish (i.e., open) a secure channel with the Billing Agent 26, whereupon the wireless LAN and Billing agent will request each other's digital certificates to validate each other's authenticity.

If the operator of the wireless LAN 20 and the Billing Agent 26 already have an established relationship, then the wireless LAN will provide the user with access, assured that the Billing Agent will provide reimbursement for the access charges. However, when no business relationship exists, then the operator of the wireless LAN 20 must establish such a relationship with the Billing Agent 26. In order to establish a relationship with the Billing Agent 26, the operator of the wireless LAN 20 will initially propose to the Billing Agent various terms and conditions, including proposed access charges, service charges and revenue sharing terms. The Billing Agent 26 could accept such proposed terms and conditions. However, the Billing Agent 26 could also return a counter proposal, especially if one or more of the charges proposed by the operator of the wireless LAN network 20 exceed the maximum charges the user will pay.

The operator of the wireless LAN 20 could accept the counter proposal. Alternatively, the operator of the wireless LAN 20 could propose a revised set of terms and conditions that the Billing Agent 26 would accept. The Billing agent could reject the revised terms by returning another counter proposal. Eventually, the Billing Agent 26 and operator of the wireless LAN 20 can reach an agreement if the maximum charges and revenue sharing terms acceptable to the Billing Agent are at least as high as the minimum charges and revenue sharing terms acceptable to the operator of the wireless LAN 20. Assuming that the Billing Agent 26 has made an acceptable counter proposal, the operator of the wireless LAN 20 will indicate such acceptance by way of a corresponding acceptance message as indicated in FIG. 2. Although not illustrated in FIG. 2, should the terms and conditions proposed by the operator of the wireless LAN 20 prove acceptable to the Billing Agent 26, then the Billing Agent will send a message indicating its acceptance.

Once a party has accepted the terms and conditions proffered by the other, then both parties will formalize (finalize) the agreement in an electronic (i.e., digital) form acknowledged by each party via its respective digital signature. As depicted in FIG. 2, once the operator of the wireless LAN 20 has agreed to the Billing Agent's counter proposal, then the Billing Agent 26 will send a formal (final) agreement, complete with an acknowledging signature, to the operator of the wireless LAN 20. In turn, the operator of the wireless LAN 20 will digitally acknowledge this agreement by appending its digital signature, whereupon the Billing Agent 26 will authenticate the user seeking access. Note that if the Billing Agent 26 had agreed to the terms and conditions proposed by the operator of the wireless LAN 20, then the wireless LAN operator would send the formal agreement, complete with an acknowledging digital signature, to the Billing Agent 26, which would return the agreement with its digital signature.

Negotiating every term and condition, especially terms and conditions other than the access and service charges and revenue sharing terms, could prove time consuming. To facilitate timely user access, a governing authority, either private or public, could require that that each Billing Agent 26 accepts certain general terms and conditions as a prerequisite for approval to extend credit to users seeking access. In this way, the subsequent negotiation between the operator of the wireless LAN 20 and the Billing Agent 20 that occur upon user access would only involve access and service charges and revenue sharing terms. Such negotiations could occur very quickly. In practice, the operator of the wireless LAN 20 will typically propose an access charge, a service charge, if any and revenue sharing terms, if any, each above a minimum acceptable level. In response, the Billing Agent 26 would counter with terms, each below the maximum allowable level. As long as the minimum access change, service charge, if any and revenue sharing terms, if any, acceptable to the operator of the wireless LAN 20 each does not exceed the corresponding maximum value acceptable to the Billing Agent 26, convergence should occur.

The negotiation process between the Billing Agent 26 and the operator of the wireless LAN 20 will fail when the wireless LAN operator seeks to impose an access charge and/or service charge in excess of that previously agreed to between the Billing Agent and the user. Under certain circumstances, the user may nonetheless accept a charge in excess of that previously agreed to with the Billing Agent 26. For example, the user may need to send an urgent message and may agree to pay more than he/she would otherwise pay for a less urgent message. To avoid a deadlock, the Billing Agent 26 could alert the user when the upon determining that one or more charges sought by the operator of the wireless LAN 20 exceeds the amount previously authorized by the user. The user can then decide whether or not to accept a higher than previously authorized charge. If the higher charge is acceptable, the user will indicate his/her approval to the Billing Agent 26, which, in turn, will send an acceptance to the wireless LAN operator. Of course, the user can always refuse to accept an excessive charge, thus foregoing access to the wireless LAN 20.

The method described with respect to FIG. 2 for establishing a business relationship between the operator of the wireless LAN 20 and the Billing Agent 26 includes a provisional approval by one party of the terms and conditions tendered by the other. The party receiving the provisional approval will then send a formal agreement in electronic form to other party who signifies its formal acceptance by digitally signing the agreement. Instead of employing such a two-step process, a party could signal its acceptance of the terms and conditions proposed by the other party by returning a digitally signed formal agreement rather than a provisional acceptance.

The foregoing describes a technique for establishing a relationship between an operator of a network, such as a wireless LAN, and a Billing Agent, to facilitate access to the network by a user served by the Billing Agent.

The invention claimed is:

1. A method for enabling an operator of a network, responsive to an access request, to establish an initial business relationship with a Billing Agent that bills a user for accessing the network, comprising the steps of:
   receiving a request from the user for access the network that includes identification of the Billing Agent;
   establishing a secure communications channel with the Billing Agent;
   verifying the Billing Agent;
   communicating to the Billing Agent proposed business terms including a charge for imposition by the network operator for access by the user; and
   receiving from the Billing Agent an acceptance of business terms agreeable to the Billing Agent.

2. The method according to claim 1 wherein the communications channel is established in response to the request for access by the user.

3. The method according to claim 1 wherein the step of verifying the Billing Agent comprises the step of exchanging certificates between the Billing Agent and the network operator.

4. The method according to claim 1 wherein the step of receiving from the Billing Agent an acceptance of business terms agreeable to the Billing Agent comprises the step of receiving one of: (1) an acceptance of the terms proposed by the network operator when the Billing Agent finds such business terms agreeable, and (2) a counter proposal of business terms acceptable to the Billing Agent when the Billing Agent finds at least one proposed term unacceptable.

5. The method according to claim 1 wherein the step of communicating to the Billing Agent proposed business terms comprises the step of communicating a revenue sharing term.

6. A method for enabling an operator of a network responsive to an access request, to establish an business relationship with a Billing Agent that bills a user for accessing the network, comprising the steps of:
   receiving a request from the user for access the network that includes identification of the Billing Agent;
   establishing a secure communications channel with the Billing Agent;
   verifying the Billing Agent;
   communicating to the Billing Agent proposed business terms including a charge for imposition by the network operator for access by the user;
   receiving from the Billing Agent one of (1) an acceptance of the terms proposed by the network operator when the Billing Agent finds such business terms agreeable, and (2) a counter proposal of business terms acceptable to the Billing Agent when the Billing Agent finds at least one of the proposed terms unacceptable; and communicating to the Billing Agent a formal agreement of the business terms acceptable to the Billing Agent and acknowledged by the network operator.

7. The method according to claim 6 wherein the communications channel is established in response to the request for access by the user.

8. The method according to claim 6 wherein the step of verifying the Billing Agent comprises exchanging digital certificates between the Billing Agent and the network operator.

9. The method according to claim 6 wherein the step of communicating to the Billing Agent proposed business terms comprises the step of communicating at least one revenue sharing term.

10. A method for enabling an operator of a network responsive to an access request, to establish an initial business relationship with a Billing Agent that bills a user for accessing the network, comprising the steps of:

receiving a request from the user for access the network that includes identification of the Billing Agent; establishing a secure communications channel with the Billing Agent in response to a request for access by a user;

verifying the Billing Agent by exchanging digital certificates between the Billing Agent and the network operator;

communicating to the Billing Agent proposed business terms including a charge for imposition by the network operator for access by the user;

receiving from the Billing Agent one of (1) an acceptance of the terms proposed by the network operator when the Billing Agent finds such business terms agreeable, and (2) a counter proposal of business terms acceptable to the Billing Agent when the Billing Agent finds at least one of the proposed terms unacceptable;

communicating to the Billing Agent a formal agreement of the business terms acceptable to the Billing Agent and acknowledged by the network operator; and receiving from the Billing Agent an acknowledgement of acceptance of the formal agreement.

11. The method according to claim 10 wherein the step of communicating to the Billing Agent proposed business terms comprises the step of communicating a revenue sharing term.

12. A method for enabling an operator of a network responsive to an access request, to establish an initial business relationship with a Billing Agent that bills a user for accessing the network, comprising the steps of:

receiving a request from the user for access the network that includes identification of the Billing Agent;

establishing a secure communications channel with the Billing Agent;

verifying the Billing Agent;

communicating to the Billing Agent proposed business terms including a proposed charge imposed by the network operator for access by the user;

communicating to a user the proposed charge for approval when the proposed charge exceeds an amount previously agreed to between the user and the Billing Agent for access; and receiving from the Billing Agent an acceptance of business terms upon acceptance of the proposed charge by the user.

13. Apparatus for enabling an operator of a network responsive to an access request, to establish an initial business relationship with a Billing Agent that bills a user for accessing the network, comprising the steps of:

means for receiving a request from the user for access the network that includes identification of the Billing Agent;

means for establishing a communications channel with the Billing Agent;

means for verifying the Billing Agent;

means for communicating to the Billing Agent proposed business terms including an access charge for imposition by the network operator for access by the user; and means for receiving from the Billing Agent an acceptance of business terms agreeable to the Billing Agent.

* * * * *